UNITED STATES PATENT OFFICE.

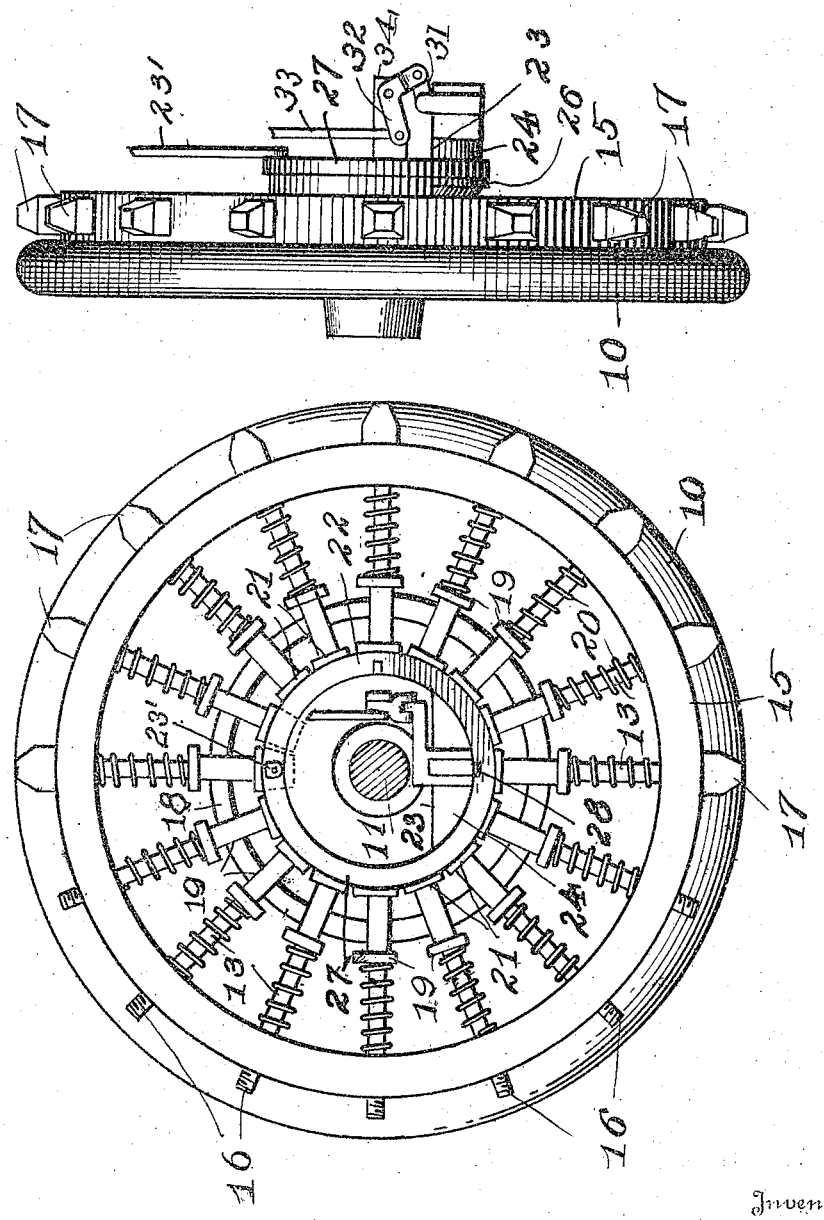

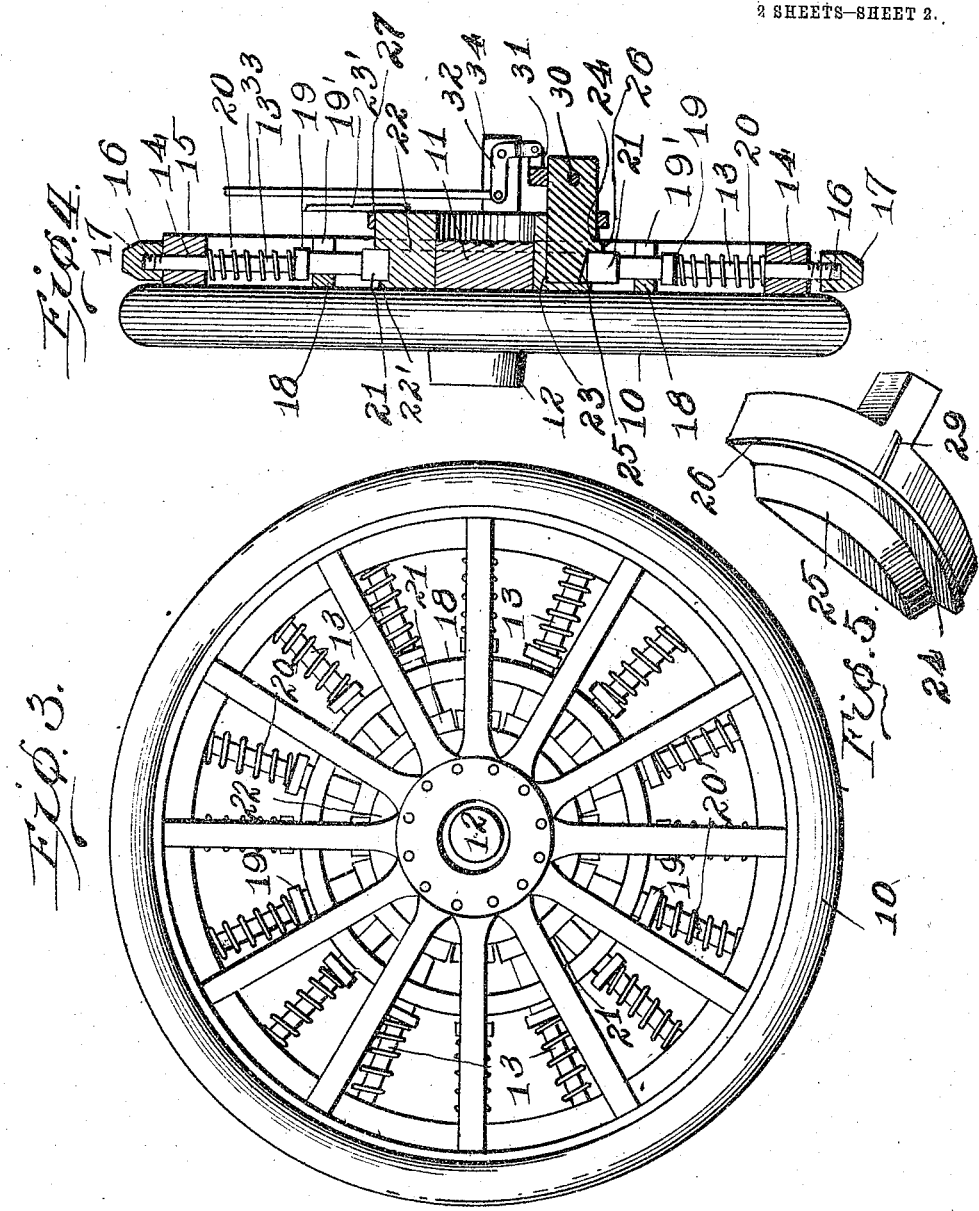

STIVE BERES, OF EAST YOUNGSTOWN, OHIO.

NON-SKID DEVICE.

1,132,905. Specification of Letters Patent. Patented Mar. 23, 1915.

Application filed March 30, 1914. Serial No. 828,237.

*To all whom it may concern:*

Be it known that I, STIVE BERES, a subject of the Emperor of Austria-Hungary, residing at East Youngstown, in the county of Mahoning and State of Ohio, have invented certain new and useful Improvements in Non-Skid Devices, of which the following is a specification.

This invention relates to certain new and useful improvements in non-skidding devices.

The primary object of the device is to provide in connection with any form of traction wheel such as a pneumatic tired automobile wheel, an attachment having calk spikes shiftable into and out of engaging position with the road bed and operable at will by the driver of the vehicle.

A further object of the device is to provide shiftable calks radially arranged around a traction wheel and automatically projected successively as they reach their downwardly-extending positions upon the turning of the wheel and whereby certain ones of said calks engage the road bed to prevent skidding and side slipping of the wheel as well as increasing the road traction qualities thereof.

A still further object is to provide a plurality of radially shiftable calk spikes arranged around a wheel and normally out of contacting engagement with the road bed but capable of manipulation at the will of the driver so that each one successively becomes projected upon reaching its lowermost position and thereby engageable with the road bed.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and in which like designating characters refer to corresponding parts throughout the several views: Figure 1 is an elevation of the inner side of a wheel provided with the present invention. Fig. 2 is a front elevation thereof. Fig. 3 is a view in elevation of the outer side of the wheel. Fig. 4 is a front view of the wheel with the elements of the invention shown in vertical central section, and, Fig. 5 is a perspective view of the shiftable wedge.

Referring more in detail to the drawings, the wheel 10 is illustrated having an axle 11 and an outwardly-extending hub 12. A plurality of radially-arranged rods 13 are slidably-mounted through perforations 14 in an outer annulus 15 secured adjacent to the wheel felly while the projecting ends 16 of said rods are screw-threaded for receiving removable calks 17 thereon and adapted to be normally positioned inwardly of the tread surface of the wheel tire so as not to engage the road bed. A band 18 is provided with open slots 19', each slot thereof adapted to receive one of the rods 13 therein for positioning said rods in their sliding movements. Collars 19 secured upon said rods position encircling springs 20 between the same and the inner periphery of the annulus 15, whereby the rods are normally projected inwardly with their base plates 21 slidably seated upon the outer periphery of a collar 22 and within a groove 22' thereof and which is secured in a stationary position against revolution in any desired manner by a connection with the vehicle, as by means of the bracket 23' which may be secured to the axle housing, the lower leaf of the automobile spring, or other fixed part of the vehicle. One side of the collar 22 is cut-away providing a seat 23 upon which is slidably-mounted the shiftable wedge 24 having an inclined or tapered arcuate inner edge 25. Said wedge is at all times positioned on the lower side of the collar 22 and therefore engageable by the bases 21 of the rods and the rods successively move across the same during the rotation of the wheel. With the wedge positioned at the limit of its movement inwardly as shown in Fig. 4, the rods are moved outwardly upon contacting the same and thereby projecting the calks 17 of the lowermost rods into contact with the road bed while with the wedge 24 outwardly positioned, the edge 25 thereof performs no function in its contact with the rods to project the same. The wedge 24 is provided with an arcuate rib 26 adapted to limit the outward movement of the wedge by coming in contact with the annular band 27 positioned at the outer edge of the collar 22 while such band is provided with an inner notch 28 for slidably receiving the transverse rib 29 of the shiftable wedge, and thereby guiding the wedge in its sliding movement.

It being desirable to place the shiftable wedge into and out of its operative position for actuating the rods, the said wedge is provided with a bolt 30 connected by a link 31 with a rocker arm 32 and actuated by means of an operating rod 33 extending to a convenient point to be reached by the driver of the vehicle while the arm 32 being pivoted to a bracket 34 upon the collar 22, provides a structure in which a downward thrust of the rod 33 withdraws outwardly the shiftable wedge 24 while an upward pull upon said rod forces said wedge inwardly for contacting engagement with the successively approaching rods 13.

With this detailed description of the device, the complete operation thereof will be apparent in that when desired to utilize the non-skid calks 17, the lever 33 is pulled upwardly for shifting the wedge 24 inwardly to the position shown in Fig. 4 and whereby its inner edge 25 is engaged successively by the rods upon a turning of the wheel and the lower ones of said rods are outwardly projected thereby. The rods and calks are normally held inactive by the resilient members 20 and in which position the calks will not engage the road bed while the wedge is retracted by a downward movement of the operating lever.

While the forms of the invention herein shown and described are what are believed to be preferable embodiments thereof, it is nevertheless to be understood that various forms and modifications thereof may be had without departing from the spirit and scope of the invention as claimed.

What I claim as new is:—

1. The combination with a wheel and axle, of a stationary collar within which said axle rotates, an annulus secured to the wheel and provided with radial perforations, radial rods slidably positioned within said perforations and having their inner ends resiliently and slidably seated upon the outer periphery of said collar, a band having slots to receive said rods, one side of said collar being formed with a seat, a wedge slidably mounted within said seat and having an inclined inner edge adapted for engagement with the inner ends of certain of said rods, and means for shifting said wedge.

2. In combination with a wheel and axle, a non-rotating collar upon said axle, an annulus concentric with said hub and provided with radial perforations, one side of said collar being formed with a seat, a wedge slidably mounted within said seat and having an inner tapered edge, rods radially arranged through the perforations of said annulus and having their outer ends screw-threaded and projecting outwardly of the annulus, springs carried by said rods and normally positioning the inner ends of said rods slidably upon said collar and wedge during a rotation of the wheel, and removable calks upon said rod ends.

3. The combination with a wheel and axle, of a stationary collar within which said axle rotates having a seat formed on one side thereof and an annular peripheral groove, an annulus secured to the wheel and provided with radial perforations, radial rods slidably positioned within said perforations and having their inner ends resiliently and slidably positioned in said groove, a wedge slidable axially within said seat and having an inclined edge adapted for engagement with the inner ends of certain of said rods, and means for shifting said wedge.

4. The combination with a wheel and axle, of a stationary collar within which said axle rotates having a seat formed on one side thereof and an annular peripheral groove, an annulus secured to the wheel and provided with radial perforations, radial rods slidably positioned within said perforations and having their inner ends resiliently and slidably positioned in said groove, a band carried by said collar, a wedge slidable axially within said seat and provided with a rib acting in conjunction with said band to limit the outward movement of said wedge, and means for shifting said wedge.

In testimony whereof I affix my signature in presence of two witnesses.

STIVE BERES.

Witnesses:
JAHN TRESSA,
ANDIJ VAJDA.